(12) United States Patent
Mitchell et al.

(10) Patent No.: US 11,909,439 B2
(45) Date of Patent: Feb. 20, 2024

(54) WAVEFRONT SENSOR WITH INNER DETECTOR AND OUTER DETECTOR

(71) Applicant: SA Photonics, Inc., Los Gatos, CA (US)

(72) Inventors: Greg G. Mitchell, Elk Grove, CA (US); William C. Dickson, Grandville, OH (US)

(73) Assignee: SA PHOTONICS, INC., Los Gatos, CA (US)

(*) Notice: Subject to any disclaimer, the term of this patent is extended or adjusted under 35 U.S.C. 154(b) by 0 days.

(21) Appl. No.: 17/726,247

(22) Filed: Apr. 21, 2022

(65) Prior Publication Data

US 2022/0345221 A1  Oct. 27, 2022

Related U.S. Application Data

(60) Provisional application No. 63/178,820, filed on Apr. 23, 2021.

(51) Int. Cl.
*H04B 10/112* (2013.01)
*H04B 10/079* (2013.01)

(52) U.S. Cl.
CPC ... *H04B 10/1121* (2013.01); *H04B 10/07953* (2013.01)

(58) Field of Classification Search
None
See application file for complete search history.

(56) References Cited

U.S. PATENT DOCUMENTS

| 3,840,794 A | 10/1974 | Clement et al. |
| 4,518,854 A | 5/1985 | Hutchin |
| 4,635,299 A | 1/1987 | MacGovern |
| 5,060,304 A | 10/1991 | Solinsky |

(Continued)

FOREIGN PATENT DOCUMENTS

EP    1806858 A1    7/2007

OTHER PUBLICATIONS

PCT International Search Report and Written Opinion, PCT Application No. PCT/US2022/025766, dated Aug. 1, 2022, nine pages.

(Continued)

*Primary Examiner* — Darren E Wolf
(74) *Attorney, Agent, or Firm* — BakerHostetler

(57) ABSTRACT

A free-space optical (FSO) terminal may include a controller and an alignment sensor. The alignment sensor includes a set of detectors. Each detector generates a signal responsive to receiving electromagnetic radiation at a detection surface. The set of detectors includes an inner set of detectors and an outer set of detectors. The detection surfaces of the inner detectors and the outer detectors may be aligned in a plane. The outer set of detectors surround the inner set of detectors (e.g., in the plane) and have larger detection surfaces than the inner set of detectors. During a tracking mode, the controller is configured to adjust an orientation of the FSO terminal based on signals from the inner set of detectors. During an acquisition mode, the controller is configured to adjust the orientation of the FSO terminal based on signals from the outer set of detectors.

20 Claims, 13 Drawing Sheets

(56) References Cited

U.S. PATENT DOCUMENTS

| | | | |
|---|---|---|---|
| 5,465,170 A * | 11/1995 | Arimoto | H04B 10/118 398/129 |
| 5,477,550 A | 12/1995 | Crisler et al. | |
| 5,483,060 A | 1/1996 | Sugiura et al. | |
| 5,701,132 A | 12/1997 | Kollin et al. | |
| 5,790,291 A | 8/1998 | Britz | |
| 6,097,522 A | 8/2000 | Maerki et al. | |
| 6,141,128 A | 10/2000 | Korevaar et al. | |
| 6,195,044 B1 * | 2/2001 | Fowell | B64G 1/28 398/9 |
| 6,469,815 B1 | 10/2002 | Poon et al. | |
| 6,535,314 B1 | 3/2003 | Mendenhall et al. | |
| 6,674,974 B1 | 1/2004 | Stieger et al. | |
| 6,683,850 B1 | 1/2004 | Dunning et al. | |
| 6,721,510 B2 | 4/2004 | Graves et al. | |
| 6,804,422 B1 | 10/2004 | Bajorins et al. | |
| 6,865,034 B1 | 3/2005 | Willis | |
| 7,072,543 B2 | 7/2006 | Pierce et al. | |
| 7,277,644 B2 | 10/2007 | Johnson et al. | |
| 7,406,263 B2 | 7/2008 | Graves et al. | |
| 7,437,077 B2 | 10/2008 | Wirth et al. | |
| 7,505,695 B2 | 3/2009 | Sugihara et al. | |
| 7,551,121 B1 | 6/2009 | O'Connell et al. | |
| 7,593,641 B2 | 9/2009 | Tegge | |
| 7,711,441 B2 | 5/2010 | Tillotson | |
| 7,809,278 B2 | 10/2010 | Morris et al. | |
| 7,835,387 B2 | 11/2010 | Agazzi et al. | |
| 8,260,146 B2 | 9/2012 | Graves | |
| 8,334,982 B2 | 12/2012 | Fang-Yen et al. | |
| 8,525,091 B2 | 9/2013 | Cui et al. | |
| 8,539,297 B1 | 9/2013 | Goyal et al. | |
| 8,660,312 B2 | 2/2014 | Cui et al. | |
| 8,942,562 B2 | 1/2015 | Pusarla et al. | |
| 9,528,817 B2 | 12/2016 | Fang-Yen et al. | |
| 9,810,862 B2 | 11/2017 | Graves et al. | |
| 10,142,030 B1 * | 11/2018 | Blanks | H04L 27/1563 |
| 10,215,936 B2 | 2/2019 | Graves et al. | |
| 10,389,442 B2 | 8/2019 | Graves et al. | |
| 10,903,901 B2 | 1/2021 | Mitchell | |
| 2001/0006210 A1 | 7/2001 | Yanagi et al. | |
| 2002/0109884 A1 | 8/2002 | Presley et al. | |
| 2002/0131121 A1 | 9/2002 | Jeganathan et al. | |
| 2002/0181055 A1 | 12/2002 | Christiansen et al. | |
| 2003/0043471 A1 * | 3/2003 | Belser | H04J 14/0208 359/634 |
| 2003/0210910 A1 | 11/2003 | Byers et al. | |
| 2004/0071398 A1 | 4/2004 | Pierce et al. | |
| 2004/0086282 A1 | 5/2004 | Graves et al. | |
| 2004/0233420 A1 | 11/2004 | Deflumere et al. | |
| 2005/0100339 A1 | 5/2005 | Tegge | |
| 2006/0222290 A1 * | 10/2006 | Yamashita | G02B 6/3586 385/18 |
| 2007/0035855 A1 | 2/2007 | Dickensheets | |
| 2007/0217795 A1 | 9/2007 | Otte | |
| 2007/0290096 A1 | 12/2007 | Jenkins et al. | |
| 2009/0123156 A1 | 5/2009 | Son et al. | |
| 2009/0213953 A1 | 8/2009 | Yang | |
| 2010/0221002 A1 * | 9/2010 | Ooi | G02B 6/2931 398/48 |
| 2011/0041041 A1 | 2/2011 | Kim | |
| 2011/0149298 A1 | 6/2011 | Arieli et al. | |
| 2012/0141144 A1 | 6/2012 | Cai et al. | |
| 2012/0248347 A1 | 10/2012 | Renna et al. | |
| 2013/0100792 A1 | 4/2013 | Nakamura | |
| 2013/0107850 A1 | 5/2013 | Agiwal et al. | |
| 2013/0156439 A1 | 6/2013 | Arnold et al. | |
| 2014/0068357 A1 | 3/2014 | Georges et al. | |
| 2014/0374575 A1 | 12/2014 | Takesue et al. | |
| 2015/0188628 A1 | 7/2015 | Chalfant et al. | |
| 2015/0215040 A1 | 7/2015 | Dickson et al. | |
| 2015/0215041 A1 | 7/2015 | Pechner | |
| 2017/0054499 A1 | 2/2017 | Graves et al. | |
| 2018/0083700 A1 * | 3/2018 | Graves | H04B 10/112 |

OTHER PUBLICATIONS

Guelman, M. et al. "Acquisition and Pointing Control for Inter-Satellite Laser Communications." IEEE Transactions on Aerospace and Electronic Systems, vol. 40, No. 4, Oct. 2004, pp. 1239-1248.

Kaymak, Y. et al. "A Survey on Acquisition, Tracking, and Pointing Mechanisms for Mobile Free-Space Optical Communications." IEEE Communications Surveys & Tutorials, vol. 20, No. 2, Feb. 9, 2018, pp. 1104-1123.

Kiasaleh, K. "Hybrid ARQ Receiver for Packet Communications over Free-Space Optical Channels." Proceedings of SPIE, vol. 6304, Sep. 1, 2006, pp. 1-12.

Lifeng, Y. et al. "A Hybrid Automatic Repeat Request (HARQ) with Turbo Codes in OFDM System." IEEE, International Conference on Computational Intelligence and Software Engineering, Dec. 10-12, 2010, pp. 1-4.

Mai, V. V. et al. "Adaptive Beam Control Techniques for Airborne Free-Space Optical Communication Systems." Applied Optics, vol. 57, No. 26, Sep. 10, 2018, pp. 7462-7471.

PCT International Search Report and Written Opinion, PCT Application No. PCT/US16/48086, dated Nov. 4, 2016, 7 pages.

PCT International Search Report and Written Opinion, PCT Application No. PCT/US16/48091, dated Nov. 15, 2016, 9 pages.

PCT International Search Report and Written Opinion, PCT Application No. PCT/US2015/013368, dated May 7, 2015, 12 pages.

Sackinger, E. "Receiver Fundamentals." Lecture Notes on: Broadband Circuit for Optical Fiber Communication, Chapter 4, Mar. 28, 2002, pp. 37-77.

Safi, H. et al. "Spatial Beam Tracking and Data Detection for an FSO Link to a UAV in the Presence of Hovering Fluctuations." arXiv Preprint arXiv:1904.03774v1, Apr. 7, 2019, pp. 1-27.

United States Office Action, U.S. Appl. No. 15/243,800, dated Aug. 24, 2017, 15 pages.

United States U.S. Appl. No. 62/238,634, filed Oct. 7, 2015.
United States U.S. Appl. No. 62/238,637, filed Oct. 7, 2015.
United States U.S. Appl. No. 62/266,710, filed Dec. 14, 2015.

* cited by examiner

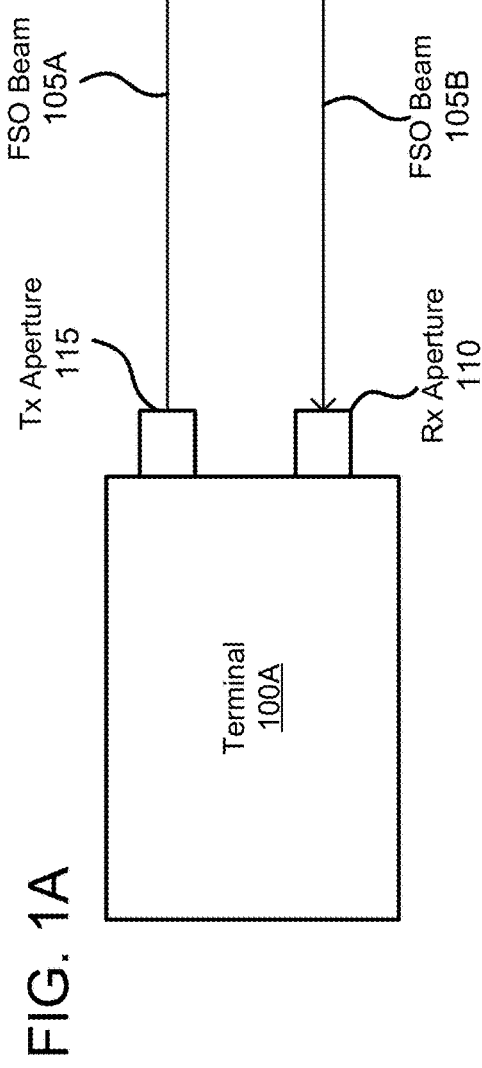
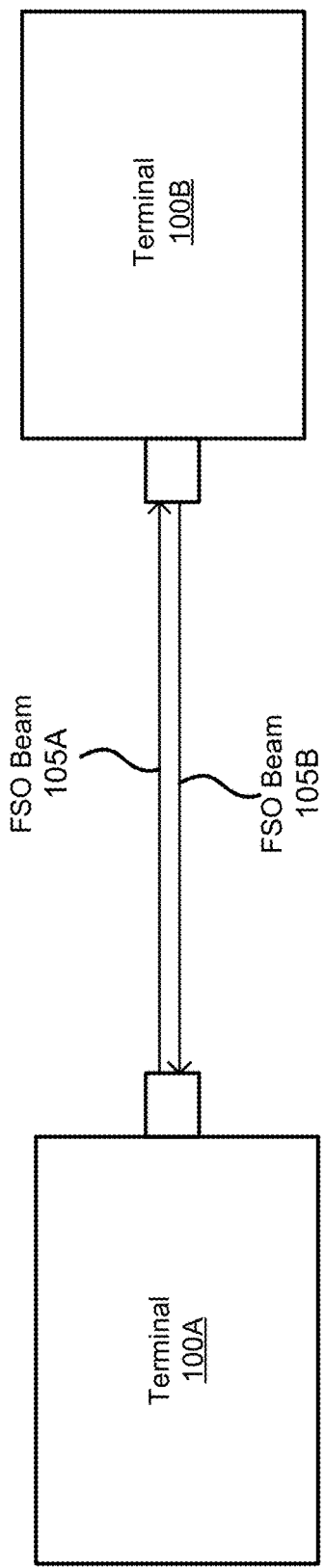
FIG. 1A
FIG. 1B

WAVEFRONT SENSOR WITH INNER DETECTOR AND OUTER DETECTOR

CROSS-REFERENCE TO RELATED APPLICATION

This application claims priority to U.S. Provisional Patent Application Ser. No. 63/178,820, "OctoCell Acquisition, Pointing and Tracking for Free Space Optical Systems," filed on Apr. 23, 2021, the subject matter of which is incorporated herein by reference in its entirety.

BACKGROUND

1. Technical Field

This disclosure relates generally to free space optical (FSO) communications and, more particularly, to an FSO communication terminal with an alignment sensor that includes an inner detector and an outer detector.

2. Description of Related Art

Free space optical (FSO) communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations. In contrast with other electromagnetic communications means, FSO signals are more directional (FSO "signals" or "beams" refers to light propagating between terminals). The directionality confers benefits both for communications capacity and for communications privacy.

However, high directionality demands accurate beam pointing between terminals and renders communication unpredictable if the FSO beams miss their intended targets. For example, if an FSO terminal is mounted on a tower, strong winds may move the tower such that the FSO terminal sways with the tower. In another example, an FSO terminal is mounted on a flying vehicle that communicates with a stationary FSO terminal. In these and similar situations, FSO terminals may perform rapid adjustment and accurate pointing to establish and maintain a reliable FSO communication link.

SUMMARY

A free-space optical (FSO) terminal may include a controller and an alignment sensor. The alignment sensor includes a set of detectors. Each detector generates a signal responsive to receiving electromagnetic radiation at a detection surface. The set of detectors includes an inner set of (e.g., at least three) detectors and an outer set of (e.g., at least three) detectors. The detection surfaces of the inner detectors and the outer detectors may be aligned in a plane. The outer set of detectors surround the inner set of detectors (e.g., in the plane) and have larger detection surfaces than the inner set of detectors. During a tracking mode, the controller is configured to adjust an orientation of the FSO terminal based on signals from the inner set of detectors. During an acquisition mode, the controller is configured to adjust the orientation of the FSO terminal based on signals from the outer set of detectors. For example, to adjust the orientation of the FSO terminal, the controller adjusts an orientation of a beam steering unit.

In some embodiments, during the tracking process, the controller is not configured to use signals from the outer set of detectors. Additionally, or alternatively, during the acquisition process, the controller may to use signals from the inner set of detectors.

The controller may perform a tracking process responsive to the FSO terminal establishing an FSO communication link with a remote FSO terminal. The controller may perform an acquisition process responsive to the FSO terminal not participating in an FSO communication link with a remote FSO terminal.

In some embodiments, the inner set of detectors forms a circle or a ring at the plane and the outer set of detectors forms a ring around the inner set of detectors at the plane. In some embodiments, the inner set of detectors forms a rectangle at the plane and the outer set of detectors forms a rectangle around the inner set of detectors at the plane.

Each detection surface of the inner set of detectors may be smaller than each detection surface of the outer set of detectors. The inner set of detectors and the outer set of detectors may include the same number of detectors. The inner set of detectors and the outer set of detectors may include the same type of detector. The outer sent of detectors may have detection surfaces larger than the detection surfaces of the inner set of detectors. Each detector surface of the inner set may be substantially the same size. Each detector surface of the outer set may be substantially the same size. Signals from the inner set of detectors may have a better signal-to-noise ratio (SNR) than signals from the outer set of detectors. In some embodiments, the inner set of detectors surround a cavity in the alignment sensor in the plane. In some embodiments, the inner set of detectors surround a detector that is not part of the inner set of detectors or the outer set of detectors. The set of detectors may include a second outer set of detectors with detection surfaces in the plane, where the second outer set of detectors surround the outer set of detectors in the plane.

In some embodiments, the FSO terminal further includes a masking layer covering a portion of the alignment sensor.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A and 1B are example diagrams of free space optical (FSO) terminals communicating via FSO communication links.

DETAILED DESCRIPTION

Figure 2:
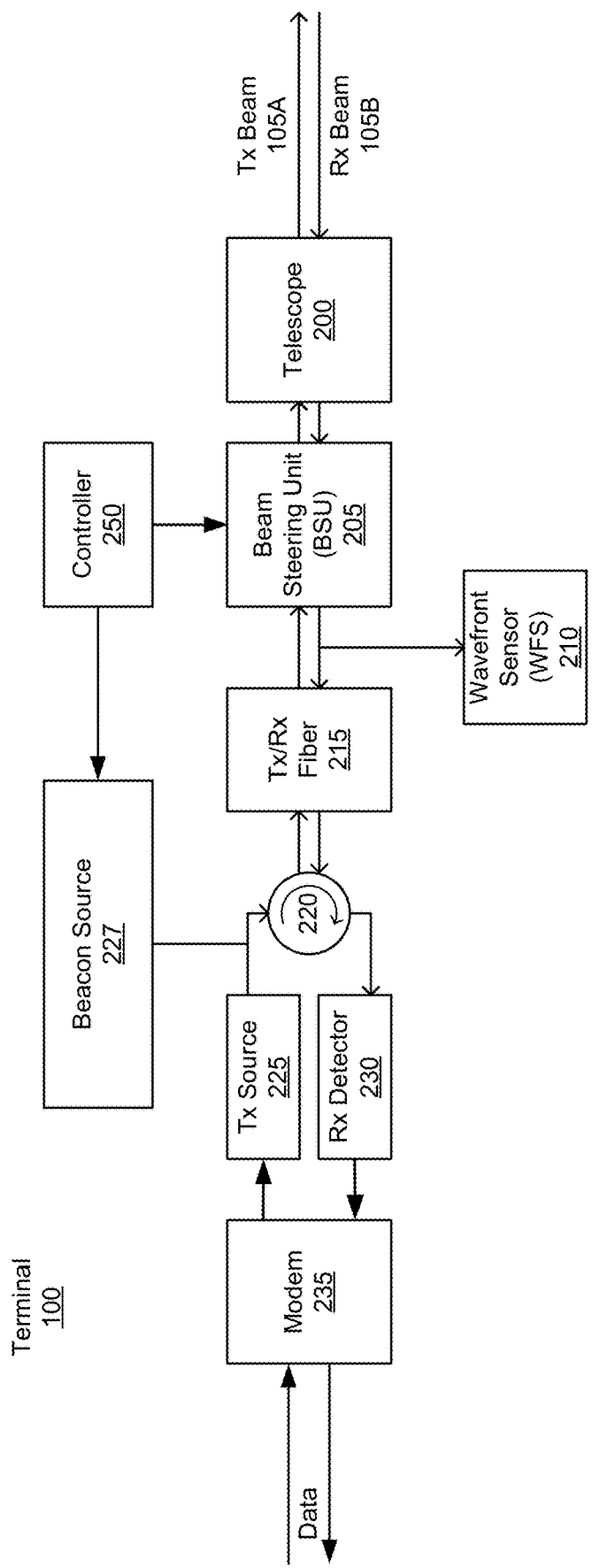
FIG. 2 is an example diagram of a single FSO terminal.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FSO Communication Terminals

FIGS. 1A and 1B are diagrams of example free space optical (FSO) terminals 100A and 100B (also referred to as nodes) communicating via FSO communication links. Specifically, the terminals 100 are communicating by transmitting and receiving data encoded FSO beams 105. In FIG. 1A, each terminal 100 receives and transmits FSO beams 105 through different apertures (the Rx aperture 110 and the Tx aperture 115), while in FIG. 1B, the terminals are co-boresighted so that beams are received and transmitted though the same aperture. As described herein, if terminal 100A is referenced as a local terminal, terminal 100B may be referred to as a remote terminal, beam 105A may be referred to as a transmit (Tx) beam, and beam 105B may be referred to as a receive (Rx) beam.

As illustrated, the terminals 100 are pointing at each other. This results in the data encoded FSO beams being received by the apertures of the receiving terminals 100. Aligning FSO terminals so that they direct their FSO beams toward each other may include a beam acquisition process. After the terminals are aligned (e.g., and a communication link is established), one or both of the terminals may perform a tracking process which helps maintain alignment as data encoded FSO beams are transmitted and received.

FIG. 2 is a diagram of a single FSO terminal 100, according to an embodiment. The terminal 100 includes a data I/O interface (not shown), modem 235, Tx source 225, beacon source 227, Rx detector 230, a circulator 220, a Tx/Rx fiber 215, a wavefront sensor 210, a beam steering unit 205, a telescope 200, and a controller 250. In FIG. 2, electrical signals (both analog and digital) are indicated by the solid arrows and optical signals (both guided and free space) are indicated by the line arrows.

The components are optically coupled as follows. The telescope 200 is optically coupled to the beam steering unit 205. The beam steering unit 205 is optically coupled to the wavefront sensor 210. It is also optically coupled to the circulator 220 via the fiber 215. The ports of the optical circulator 220 are optically coupled to the Tx source 225 and beacon source 227 (which are combined into one port), the Tx/Rx fiber 215, and Rx detector 230.

The components are electrically coupled as follows. The controller 250 is electrically coupled to the beam steering unit 205 and the beacon source 227. The modem 235 is electrically coupled to the Tx source 225 and the Rx detector 230. In some embodiments, the controller 250 is electrically coupled to the wavefront sensor 210 or the modem 235 (not illustrated).

The terminal 100 includes at least two optical paths: an Rx beam path and a Tx beam path. In the Rx beam path, a Rx beam 105B propagates through the telescope 200 and is directed towards the beam steering unit 205. The beam steering unit 205 steers the Rx beam to the wavefront sensor 210. A portion of the beam is detected by the wavefront sensor 210 and another portion of the beam is coupled into the fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the beam steering unit 205. The Tx beam is directed by the beam steering unit 205 towards the telescope 200. The Tx beam 105A propagates through the telescope 200 and into free space (e.g., toward a remote FSO terminal).

The telescope 200 and beam steering unit 205 are optical components that direct Rx beams to the wavefront sensor 210 and fiber 215, and direct Tx beams to the remote terminal. In some embodiments, the telescope 200 is positioned upstream of the beam steering unit 205 with respect to the Tx beam path. The telescope 200 includes components that can spread, focus, redirect, and otherwise modify the beams 105 passing through it. The position of the telescope 200 relative to the terminal 100 is typically fixed. The telescope 200 may be as simple as a single lens or it may include additional optical components, such as diffusers, phase screens, beam expanders, mirrors, and lenses.

Many embodiments of the beam steering unit 205 are compatible with the present invention. This can be, for example, a mechanically driven reflective or refractive device. Examples of such devices include mirrors, Fresnel devices, and lenslet arrays. The mechanical driver for any one of these examples may include voice-coil actuators, piezoelectric actuators, and servo-motor driven positioners. Additionally, or alternatively, microelectronic array (MEMS) devices or opto-acoustic devices that exploit acoustic waves in reflective or refractive materials can be used.

The beam steering unit 205 (e.g., controlled by the controller 250) may operate in different modes, such as a beam acquisition mode or a beam tracking mode. For example, an initial Tx direction can be established through a beam acquisition mode. The Tx direction may be determined or updated based on feedback signals (e.g., alignment errors), for example from the wavefront sensor 210 (this feedback path not shown in FIG. 2). In some cases, the Tx beam 105A is transmitted by the telescope 200 along the same direction as the Rx beam 105B is received (the Rx direction may be determined from the wavefront sensor 210). In some cases, the Tx direction is not parallel to the Rx direction. For example, atmospheric conditions between terminals 100 can affect beams differently depending on their propagation direction. In these cases, Tx and Rx beams may travel different optical paths between terminals 100.

The wavefront sensor 210 is an alignment sensor that detects incident electromagnetic radiation (e.g., light). The wavefront sensor 210 includes detectors to determine the position of an incident Rx beam. For example, the wavefront sensor 210 may be a quad-cell or other multi-cell sensor. Each detector of the wavefront sensor 210 may be a photodetector or other electromagnetic-wave detector that convert an incoming electromagnetic wave into a signal (e.g., electrical current). The generated signal may be an analog (or digital) signal that indicates the amount of electromagnetic radiation received at the detection surface. For example, the amplitude of the signal represents, is proportional to, or approximate to the amount of received light (e.g., the power, light energy over time, or radiant flux of the received light). In some embodiments, the detectors may include signal conditioners and amplifiers to increase their detection capabilities.

Since Tx and Rx beams are typically in the visible or IR spectrum, a detector may be configured to generate signals responsive to receiving radiation in the visible or IR spectrum. If the wavelength ranges of the Tx and Rx beams are known, a detector may be configured to generate signals responsive to receiving radiation in the wavelength ranges of the Tx and Rx beams. For example, a detector includes one or more wavelength filters on the surface of the detector to filter the incoming radiation. Additionally, or alternatively, the wavefront sensor 210 can include detectors capable of detecting different types of electromagnetic radiation, e.g., low and high light intensities, specific wavelengths, etc. This allows the terminal 100 to operate in low light (e.g., at night) and high light situations (e.g., at mid-day).

The wavefront sensor 210 may include a hole or cavity filled by an end of the fiber 215. This can allow light directed to the wavefront sensor 210 to be coupled into the fiber 215. Example wavefront sensors 210 are further described below with respect to FIGS. 3A-9.

The Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate through the inner cladding. The circulator 220 can be a single-mode or multi-mode circulator. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The modem 235 modulates data to be transmitted in Tx beams. Specifically, the modem 235 converts incoming data from the I/O interface 240 into a modulated electrical signal. The modulated signal is sent to the Tx source 225 and converted into a Tx beam. The modem 235 can also demodulate data encoded in Rx beams. Specifically, the modem 235 decodes information in the electrical signals from the Rx detector 230. The remaining decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

The beacon source 227 is an optical source (such as a laser) that can produce beacon beams. If the beacon source 227 and the Tx source 225 are separate components, the beacon source 227 may share a port of the circulator 220 with the Tx source 225 so that beams from the beacon source 227 are also directed by the fiber 215, beam steering unit 205 and telescope 200. In some embodiments, beams from the beacon source 227 have a fixed wavelength. In other embodiments, the beacon source 227 can produce beacon beams at different wavelengths. For example, the beacon source 227 can produce a beacon beam with a wavelength in the range of 1540-1570 nanometers. The beacon source 227 may produce beams at specific wavelengths responsive to instructions from the controller 250.

As used herein, an FSO beam may refer to a beacon beam, a Tx beam, or an Rx beam. A beacon beam may refer to an FSO beam emitted by a beacon source (e.g., 227), and a Rx or Tx beam may refer to a FSO beam emitted by a Tx source (e.g., 225). Rx and Tx beams are typically data encoded, however beacon beams may also be data encoded. Generally, beacon beams are used for aligning terminals with each other while Tx and Rx beams are used to communicate data moving through a network. However, this is not required. For example, an Rx beam may be used to align a terminal (e.g., during a tracking process).

As suggested above, beacon beams from the beacon source 227 may be used during a beam acquisition process to establish an FSO communication link and also during a tracking mode to maintain the FSO communication link. Beacon beams typically have larger divergences than Rx or Tx beams (e.g., data encoded beams from the Tx source 225). For example, the divergence of beacon beams may be two to four times larger than the divergence of a Tx beam (however larger and smaller ratios are also possible). Beam divergence is a measure of the increase in a beam's diameter or radius with distance. In some embodiments, the beacon source 227 and the Tx source 225 are a single component. That is, for example, the FSO beam produced by the single source 227/225 is used both as a beacon beam during the beam acquisition process and as the Tx beam during data transmission.

Beacon beams may be orthogonal to Rx beams. Orthogonality may be implemented with different physical and directional characteristics, separation by interleaving in time, separation by using different carrier wavelengths or polarization, or other means. In some embodiments, a beacon beam may be present as a submodulation on an Rx beam. For example, a data encoded Rx beam may be modulated at a low frequency, such as 10 kHz, in such a way that it does not interfere with other communications but that makes the 10 kHz signal readily detected with high reliability.

The controller 250 receives information (e.g., from the wavefront sensor 210 or the modem 235) to determine alignment errors between the terminal 100A and the remote terminal 100B. The controller 250 provides instructions to the beam steering unit 205 to reduce the alignment errors based on the received information. Additionally, or alternatively, the controller 205 may adjust the position of the wavefront sensor 210 relative to the beam steering unit 205 to reduce the alignment errors (e.g., via one or more motors). In some embodiments, the controller 205 controls the beacon source 227 to reduce alignment errors. For example, the telescope 200 may be is designed so that it changes the divergence of a beacon beam based on its wavelength. When the controller 205 adjusts the wavelength of the beacon source 227, it in turn controls the divergence of the transmitted beacon beam.

In some embodiments, the controller 250 uses signals from the Rx detector 230, modem 235, or WFS 210 to determine whether received light is a FSO beam or an interfering signal. Interfering signals may originate from other stations nearby but not of interest, from natural sources such as the sun or other emitters, or from deliberate attempts by an adversary to jam the signal.

Establishing an FSO Communication Link

As stated above, to establish an FSO communication link, the controller 250 may perform a beam acquisition process. For example, the controller 250 may be configured to perform an acquisition process responsive to determining that the terminal 100 does not have an established or active (in some cases) FSO communication link with a remote terminal. To maintain an FSO communication link, the controller 250 may perform a tracking process. For example, the controller 250 may perform a tracking process responsive to the terminal 100 establishing an FSO communication link with a remote FSO terminal. A tracking process may include actively maintaining an FSO communication link with (e.g., precision) control of the pointing angles between the two terminals.

Tracking processes are generally characterized by small changes in the BSU 205 pointing direction (e.g., 0-100 milliradians) while acquisition processes are generally characterized by larger changes in the BSU 205 pointing direction (e.g., greater than 100 milliradians). In some cases, an FSO beam size (e.g., diameter) on the WFS 210 may be small during a tracking process and larger during an acquisition process. This may be due to a received FSO beam having a larger divergence during the acquisition process (e.g., a tracking FSO beam may have a divergence of 50 microradians while an acquisition FSO beam may have a divergence of 150 microradians). For example, a remote terminal may transmit a beacon beam (e.g., from beacon source 227) when it performs an acquisition process and it may transmit a data encoded beam (e.g., from Tx source 225) during a tracking process or after an FSO communication link is established. Example acquisition processes are further described with respect to FIGS. 11-13.

Example Wavefront Sensors

Figure 3A:
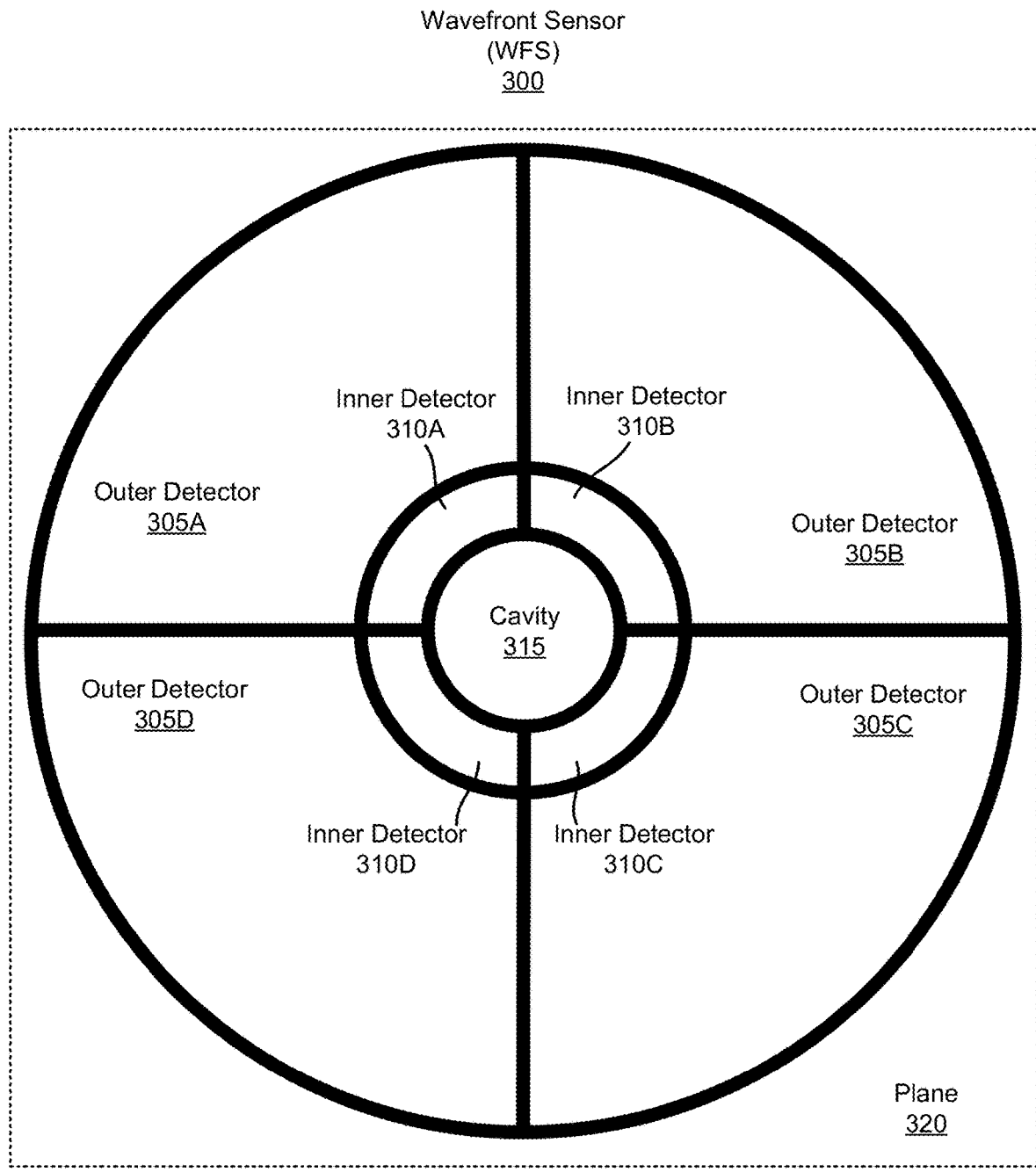
FIG. 3A is a front view of an example wavefront sensor (WFS).
Figure 3B:
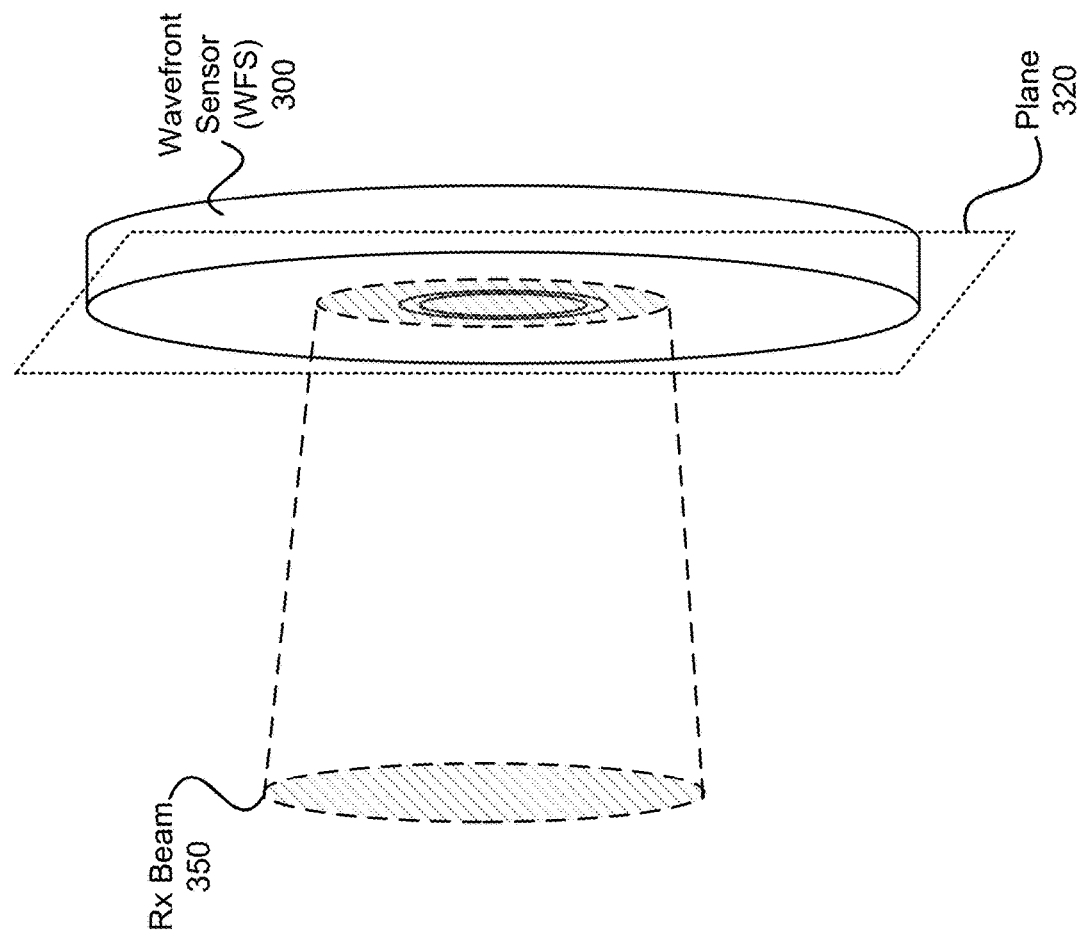
FIG. 3B is a perspective view of the WFS in FIG. 3A.

FIG. 3A is a front view of an example WFS 300, and FIG. 3B is a perspective view of WFS 300. WFS 300 may be an embodiment of WFS 210. The WFS 300 includes a cavity 315, a set of inner detectors 310A-D (collectively referred to as 310), and a set of outer detectors 305A-D (collectively referred to as 305). The detectors 305, 310 have detection surfaces in plane 320 (although this is not required). Due to engineering limitations, the detection surfaces may be aligned with plane 320 within a predetermined error threshold, for example on the order of millimeters or micrometers. As used here, detection surfaces "in a plane" may refer to the detection surfaces being aligned with the plane within the predetermined error threshold. Note that the detectors 305, 310 are not illustrated in FIG. 3B. Additionally, FIG. 3B includes an example Rx beam 350 directed to the WFS 300 (e.g., by BSU 205).

In the example of FIGS. 3A-B, the cavity 315 is positioned in the center of the WFS 300. The inner detectors 310 are adjacent to the cavity 315 and surround the cavity in plane 320. The outer detectors 305 are adjacent to the inner detectors 310 and surround the inner detectors 310 in plane 320. More specifically, the cavity 315 is a circular hole, the inner detectors 310 form a ring around the cavity 315, and the outer detectors 305 form a ring around the inner detectors 310. The WFS 300 may include in additional, fewer, or different components than those illustrated.

In some embodiments, an optical fiber (e.g., 215) is positioned in the cavity 315 so that light on the WFS 300 may be coupled into the fiber and directed to an Rx detector (e.g., 230). In some embodiments, the cavity 315 is not coupled to an optical fiber. Thus, light may pass through the cavity 315 and on to an additional detector (e.g., behind the WFS 300). In these embodiments, additional alignment or refocusing optics (e.g., in the cavity 315 or behind the cavity 315) may be used to direct the light on to the additional detector. Among other advantages, this arrangement may allow the additional detector to include additional components (e.g., signal conditioning elements) to enhance the sensitivity and bandwidth of the additional detector. There may be other benefits for having the cavity 315 in the center of the WFS 300. For example, the beacon path may be concentric with the data path. This may allow the terminal to maintain boresight between the beacon and Rx beam paths, whereas other architectures may have boresight drift if the paths are separate.

In the example of FIGS. 3A-B, each outer detector has the same shape and same detection surface area as every other outer detector. Similarly, each inner detector has the same shape and detection surface area as every other inner detector. Furthermore, the detectors 305, 310 may be the same type of detector (e.g., a photodetector).

The size (e.g., diameter) of the WFS 300 may be determined by a desired detection field of view and space constrains of the FSO terminal. Generally, increasing the size of the WFS 300 (e.g., by enlarging the detection surfaces of the detectors or by adding new detectors) may increase the detection field of view of the WFS 300.

In the example of FIGS. 3A-B, the WFS 300 includes four inner detectors 310 and four outer detectors 305. However, this is not required. For example, the inner set or the outer set my have a different number of detectors. Generally, increasing the number of detectors may increase the resolution of the WFS 300. However, increasing the number of detectors may result in crosstalk, additional contact outputs, and system complexity. Since signals from the detectors may be used to adjust the alignment of the terminal so that an Rx beam is centered on cavity 315, each set of detectors (e.g., the inner set and outer set) may include at least three detectors.

As illustrated in FIGS. 3A-B, the combined detection surface area of the outer detectors 305 is greater than the combined detection surface area of the inner detectors 310. In the example of FIGS. 3A-3B, the outer detectors 305 have larger detection surfaces than the inner detectors 310 (however in other embodiments, the outer detectors may have the same or smaller detection surfaces but there may be more outer detectors so that the combined detection surface area is still larger). A larger combined detection surface area allows the outer detectors to detect Rx beams at larger misalignment angles than the inner detectors. These outer detectors 305 may be used for initial detection and position acquisition. Together, the detectors 305 may form a gradient detector. In the example of FIGS. 3A-B, the four detectors may form a two-directional gradient detector.

On the other hand, the inner detectors 310 are smaller and have smaller total detection surface area. For example, an outer detector (e.g., 305A) is 10×-30× the size (e.g., surface area) of an inner detector (e.g., 310A). Signals from these inner detectors 310 may be used for fine position acquisition or for beam tracking. With their smaller size, these inner detectors 310 may be suited to measuring smaller deviations from the signal direction (compared to the deviations measured by the outer detectors 305). Using detector signals to adjust the alignment of the terminal is further described with respect to FIGS. 7-8.

Figure 4:
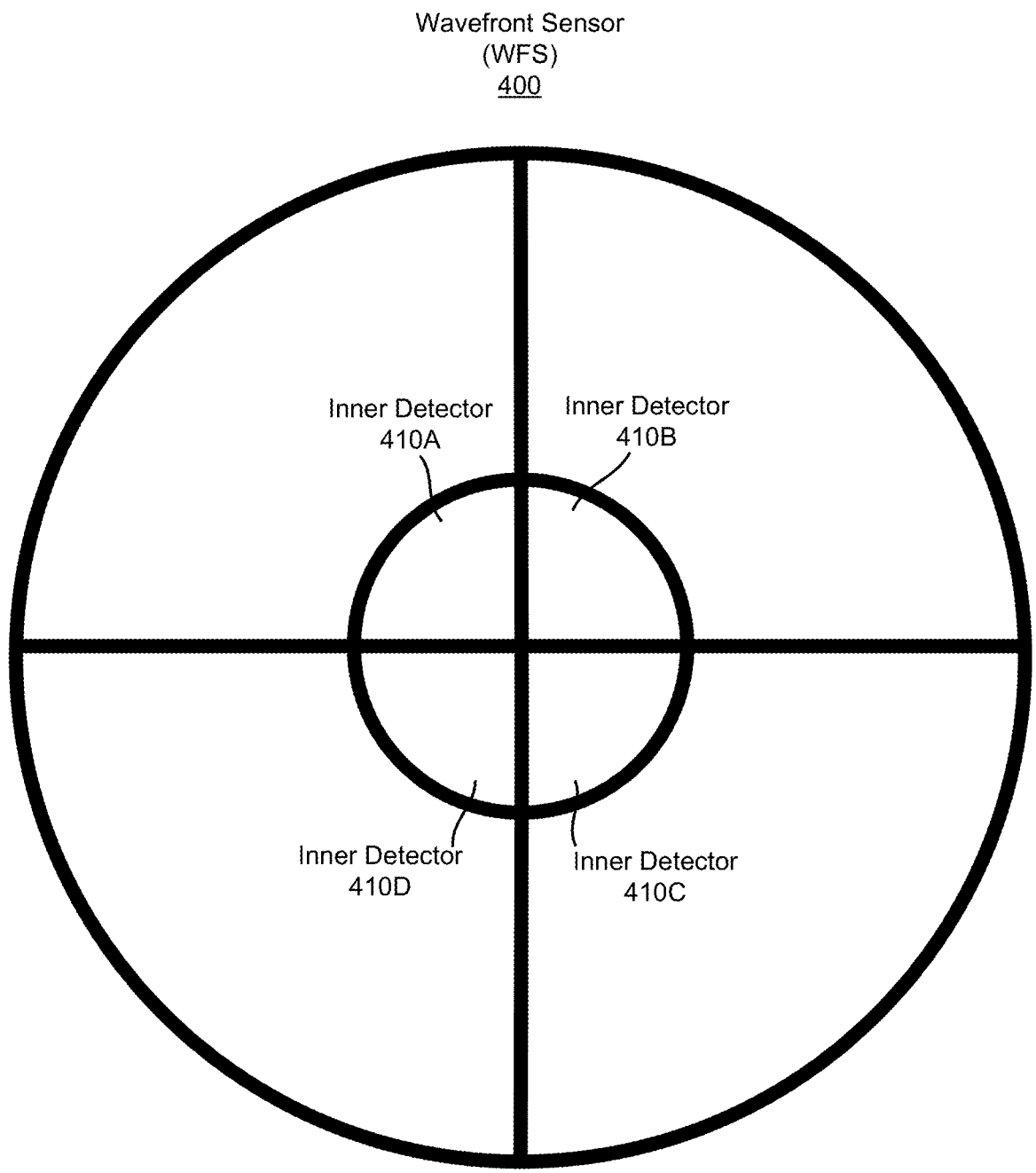
FIG. 4 is a front view of a second example WFS.

FIG. 4 is a front view of a second example WFS 400. WFS 400 is similar to WFS 300 except WFS 400 does not include a cavity. Instead, the inner detectors 410A-C extend to the center of the WFS 400. WFS 400 may be implemented in the optical train described with respect to FIG. 9.

Figure 5:
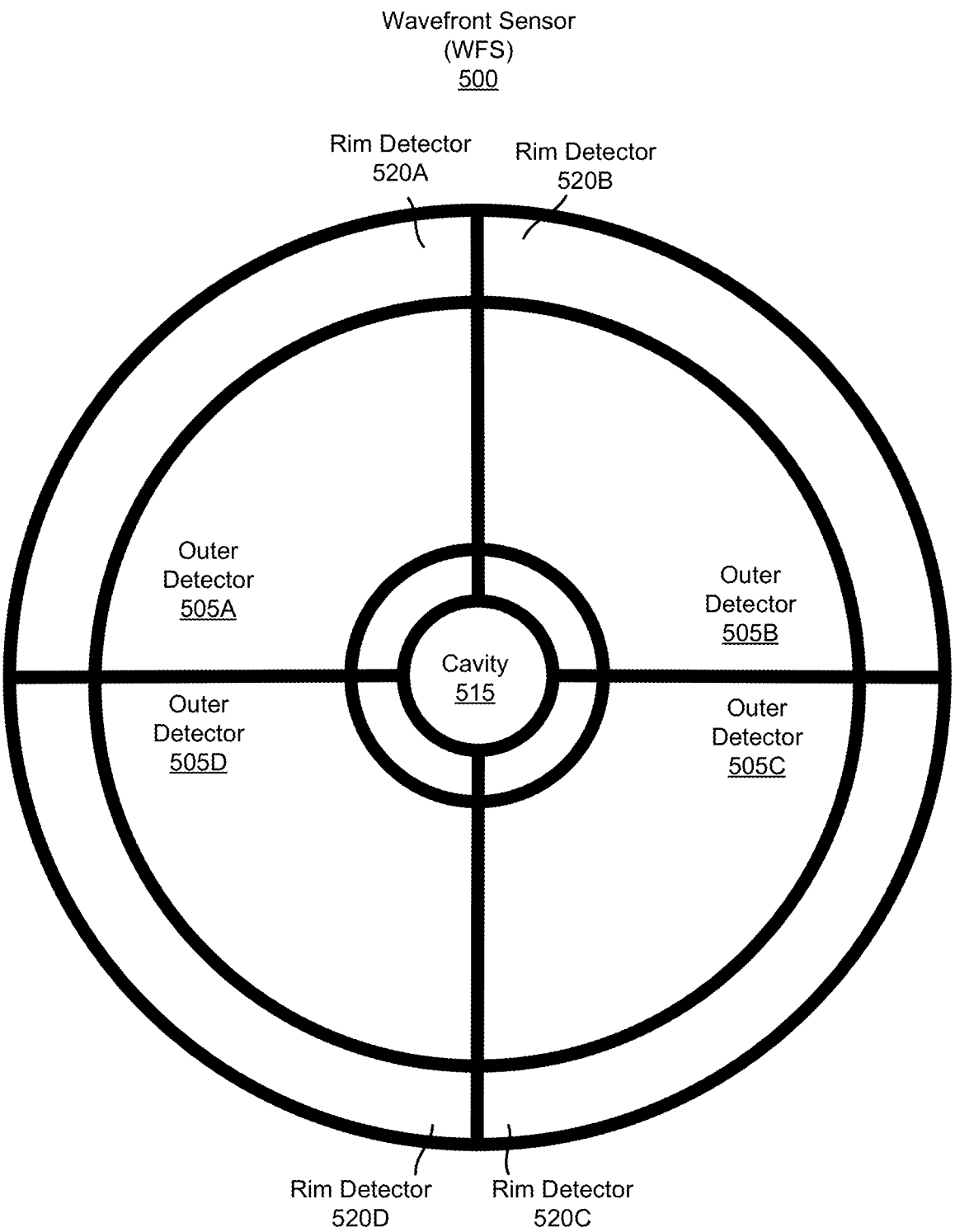
FIG. 5 is a front view of a third example WFS.

FIG. 5 is a front view of a third example WFS 500. WFS 500 may be an embodiment of WFS 210. WFS 500 is similar to WFS 300 except WFS 500 includes an additional set of rim detectors 520A-D (collectively referred to as 520)

around the outer detectors 505A-D. The rim detectors 520 may also be referred to as a second set of outer detectors. These rim detectors 520 may provide additional information to determine the location of an Rx beam on the WFS 500, for example, when a Rx beam is far from the cavity 515. A WFS may have more than one set of rim detectors. For example, a WFS includes additional layers or rings of rim detectors than those illustrated in FIG. 5.

Figure 6:
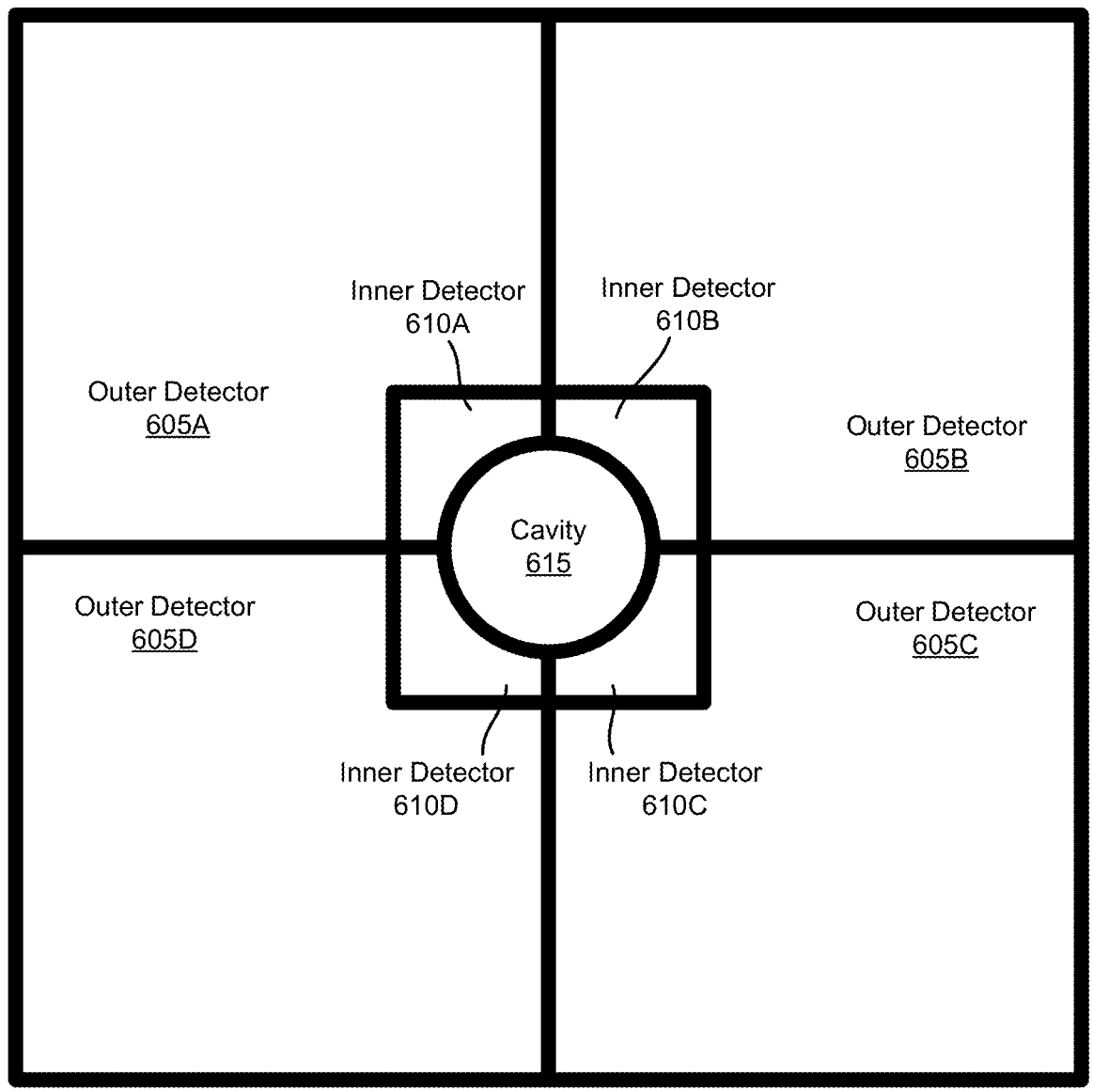
FIG. 6 is a front view of a fourth example WFS.

FIG. 6 is a front view of a fourth example WFS 600. WFS 600 may be an embodiment of WFS 210. WFS 600 includes different shaped detectors compared to WFS 300. While WFS 300 is circular, WFS 400 is rectangular. Specifically, the outer edge of the inner detectors 610A-D forms a rectangle around cavity 615 and the outer edge of the outer detectors 605A-D also forms a rectangle around the inner detectors 610A-D.

Figure 7:
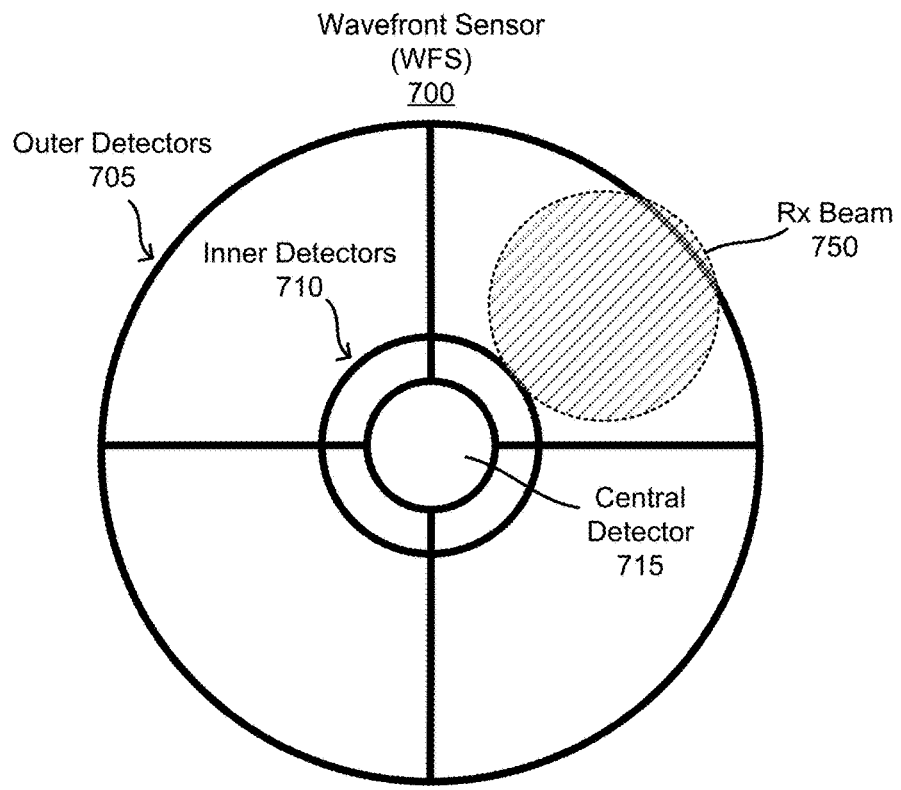
FIGS. 7-8 are example diagrams of an FSO beam incident on a WFS.
Figure 8:
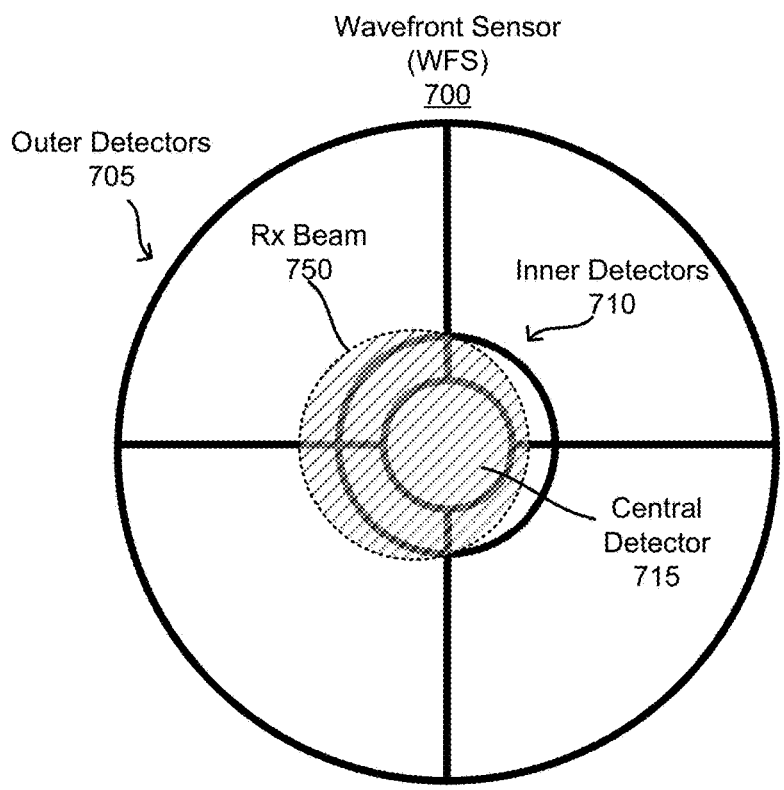

FIGS. 7-8 are example diagrams of an Rx beam 750 incident on a WFS 700. In FIG. 7, the Rx beam 750 is incident on a top-right detector of the outer detectors 705. In FIG. 8, the Rx beam 750 is closer to the center of the WFS 700. Specifically, the Rx beam 750 is slightly offset from the center and is incident on the inner detectors 710. In the example of FIGS. 7-8, the center circle is a detector (e.g., an Rx detector) instead of a cavity. This detector may be referred to as the central detector 715 or a primary detector. The central detector 715 is not required to be in the center of the WFS 700. Among other advantages, a central detector 715 instead of a cavity with an optical fiber may result in less dead space on the WFS 700.

FIG. 7 shows how the outer detectors 705 may enable detection of large optical misalignments from the central detector 715. Specifically, the Rx beam 750 angular offset is so large that the central detector 715 doesn't receive any portion of the Rx beam 750. However, since the Rx beam 750 is incident on an outer detector, a controller (e.g., 250) may determine the location of the Rx beam on the WFS 700 (e.g., based on the signals from the detectors) and re-orient the FSO terminal to improve the optical alignment with the remote terminal (e.g., during an acquisition mode). For example, the controller may adjust a BSU (e.g., 205) so the Rx beam 750 is shifted down and to the left. To determine the horizontal and vertical displacement of the Rx beam 750 signals from the detectors (e.g., 705 or 710) may be compared to each other.

FIG. 8 shows how the inner detectors 710 may enable detection of smaller optical misalignments from the central detector 715. Specifically, the Rx beam 750 is offset from the central detector 715 but is close enough that the central detector 715 still receives a portion of the Rx beam 715. The inner detectors 710 also receive portions of the Rx beam 750. These inner detectors 710 allow the controller to detect smaller misalignments from the central detector 715 and adjust the FSO terminal accordingly (e.g., during a tracking mode). For example, signals from the inner detector 710 may be compared to each other to determine that the Rx beam 750 is offset to the left (e.g., the left inner detectors may have stronger signals than the right inner detectors). In some embodiments, signals from the outer detectors 705 may also be used to determine the position of the Rx beam 750. Thus, the inner detectors 710 may allow the controller to correct a misalignment before it affects the amount of Rx beam 750 received by the central detector 715 (e.g., thus helping maintain a previously established FSO communication link).

In some embodiments, instead of adjusting the terminal so that the Rx beam 750 is centered on the central detector 715, the controller may direct the Rx beam 750 to another portion of the WFS 700. For example, to account for point ahead, the controller adjusts the terminal so that the Rx beam 750 is directed toward one of the inner detectors 710. This may allow the terminal to account for point ahead while allowing the central detector 715 to still receive a portion of the Rx beam 715 (e.g., to maintain an FSO communication link).

Among other advantages, the use of the inner detectors 710 and the outer detectors 705 increases the resolution of the WFS 700 (comparted to a WFS without the inner detectors). This may allow the controller to determine the location of the Rx beam 750 more accurately on the WFS 700. Additionally, or alternatively, the smaller inner detectors further provide finer alignment information near the central detectors compared to larger detectors.

Additionally, or alternatively, the inner detectors 710 may have better signal-to-noise ratios (SNRs) than the outer detectors 705 (e.g., in the electrical circuits as well as the received electromagnetic radiation). Background noise may be generated by a BSU (e.g., 205) or a telescope (e.g., 200) reflecting radiation (e.g., emitted from the Tx/Rx fiber 215)) back towards the WFS 700. This may be referred to as back reflection. Detectors may receive other types of radiation as well, such as solar radiation or radiation from an adversary trying to interfere. Since the inner detectors 710 have smaller detection surfaces than the outer detectors 705, the inner detectors 710 may receive less back reflection and thus have better SNRs than the outer detectors 705.

Using Detector Signals During Acquisition and Tracking Modes

As stated in the above descriptions, signals from the outer detectors 705 may be used by a controller (e.g., 250) to determine a position of Rx beam 750 on the WFS 700 during an acquisition mode. Generally, the misalignment between terminals is large during an acquisition process. Thus, detectors with large detection surfaces areas may be more beneficial for initially detecting light from the remote terminal. Said differently, the outer detectors may be beneficial during an acquisition process because they provide a larger detection field of view compared to the inner detectors 710. Furthermore, the size of a received FSO beam may be larger during the acquisition process (e.g., because the remote terminal is emitting beacon beams with larger divergences than data encoded beams). If this occurs, signals from the inner detectors 710 may provide less position information and thus be less beneficial (e.g., the FSO beam spot size on the WFS 700 is so large that an inner detector receives the same amount of light over a range of different FSO beam positions on the WFS 700). Thus, signals from the inner detectors 710 may be ignored during an acquisition process. That being said, in some embodiments, the controller may also use signals from the inner detectors 710 during an acquisition process (e.g., they are weighted differently than signals from the outer detectors 705).

Separately, signals from the inner detectors 710 may be used by the controller to determine a position of Rx beam 750 on the WFS 700 during a tracking mode. Generally, the misalignment between terminals is small during a tracking process. Thus, detectors with smaller detection surfaces areas may be more beneficial for correcting smaller optical misalignments with the remote terminal. For example, if the Rx beam is slightly offset from the center (e.g., as in FIG. 8), the amount of light received by an outer detector may be so small that the generated signal undetectable over the background noise. Furthermore, the size of a received FSO beam may be smaller during the tracking process (e.g., because the remote terminal is emitting data encoded Rx beams with smaller divergences). If this occurs, signals from the outer detectors 705 may provide less position information and thus be less beneficial (e.g., the FSO beam spot size on the WFS 700 is so small that an outer detector receives the same amount of light over a range of different FSO beam positions on the WFS 700). Thus, signals from the outer detectors 705 may be ignored during a tracking process. That being said, in some embodiments, the controller may also use signals from the outer detectors 705 during the tracking mode (e.g., they are weighted differently than signals from the inner detectors).

Wavefront Sensor Dead Zones

Edges of the detectors (e.g., 705, 710) may be marked by dead zones. Dead zones do not generate signals responsive to receiving electromagnetic radiation. Dead zones may provide space for lead lines of the detectors (e.g., the inner detectors).

In some embodiments, a masking layer is placed over a portion of a WFS. A masking layer may be a blocking, absorbing, or reflecting material (e.g., a metal layer). This may enhance the response of the WFS. For example, a masking layer on an inactive region (e.g., dead zone) between a cavity (e.g., 315) and inner detectors (e.g., 310) may reduce or prevent light incident on that inactive region from corrupting the inner detector signals. In another example, this material may be placed in gaps between detectors to reduce or prevent cross-coupling between the detectors.

First Example Optical Train

Figure 9:
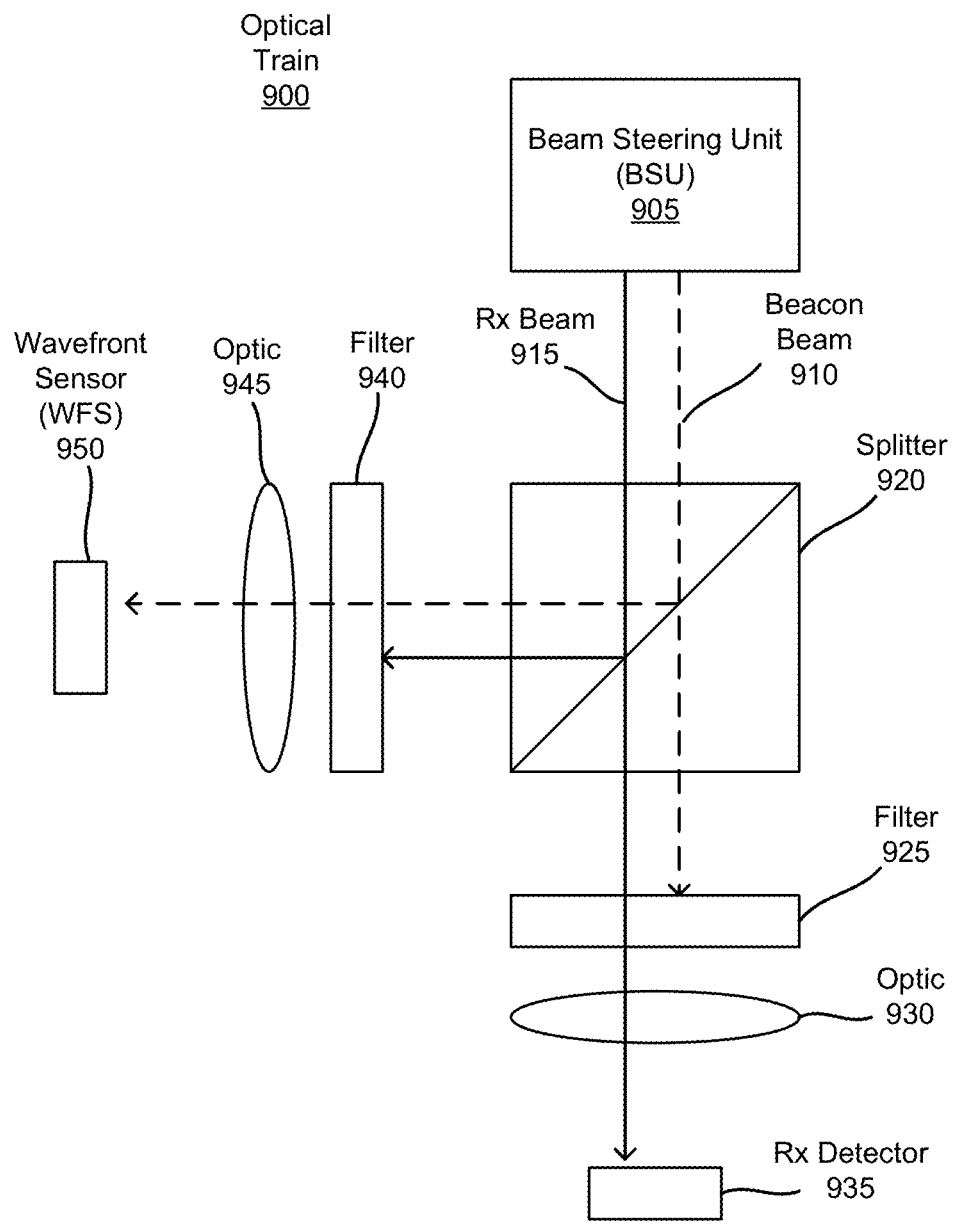
FIG. 9 is a diagram of an example optical train for FSO beams received by an FSO terminal.

FIG. 9 is a diagram of an example optical train 900 for FSO beams received by a terminal (e.g., terminal 100A). The optical train includes a BSU 905; a splitter 920; filters 925, 940; optics 930, 945; a WFS 950; and an Rx detector 935. Among other advantages, the optical train 900 separates an Rx beam 915 from a beacon beam 910 that are propagating together so that the Rx detector 935 (e.g., only) receives the Rx beam 915 and the WFS 950 (e.g., only) receives the beacon beam 910. The example optical train 900 in FIG. 9 is not used to direct Tx beams. For example, the optical train 900 is implemented in a terminal that has different apertures for Rx and Tx beams (e.g., as illustrated in FIG. 1A). The optical train 900 may include in additional, fewer, or different components than those illustrated.

In FIG. 9, the Rx beam 915 and the beacon beam 910 are directed by the BSU 905 towards the splitter 920. The splitter 920 splits the beams along two optical pathways. One of the pathways includes filter 925, optic 930, and Rx detector 935. The other pathway includes filter 940, optic 945, and WFS 950. Optic 930 directs (e.g., focuses) light of the Rx beam 915 towards Rx detector 935. Optic 945 directs (e.g., focuses) light of the beacon beam 910 towards WFS 950.

Filter 925 blocks wavelengths of beacon beam 910 (e.g., and wavelengths from other potential background sources). This prevents the Rx detector 935 from receiving light from the beacon beam 910 (e.g., and other background sources) and may thus increase the SNR of the Rx detector 935, assuming the Rx and beacon beams have different wavelengths. Filter 940 blocks wavelengths of Rx beam 915 (e.g., and wavelengths from other sources, such as back reflection). This prevents the WFS 950 from receiving light from the Rx beam 915 (e.g., and other background sources) and may thus increase the SNR of the WFS 950. Since the position of the Rx beam 915 on the WFS 950 may provide beneficial alignment information, in some embodiments the optical train 900 does not include filter 940. If the Rx beam 915 and the beacon beam 910 include the same wavelengths or overlapping wavelengths, the filters 925, 940 may be omitted from the optical train 900, or the filters 925, 940 may be configured to block wavelengths outside of the Rx and beacon wavelengths.

The WFS 950 may include a hole or cavity (e.g., as illustrated in FIG. 3A), for example, that allows light to pass through to another detector (e.g., via an optical fiber). Instead of a hole or cavity, the WFS 950 may include a central detector (e.g., as illustrated in FIG. 7) or no central detector (e.g., as illustrated in FIG. 4).

Second Example Optical Train

Figure 10:
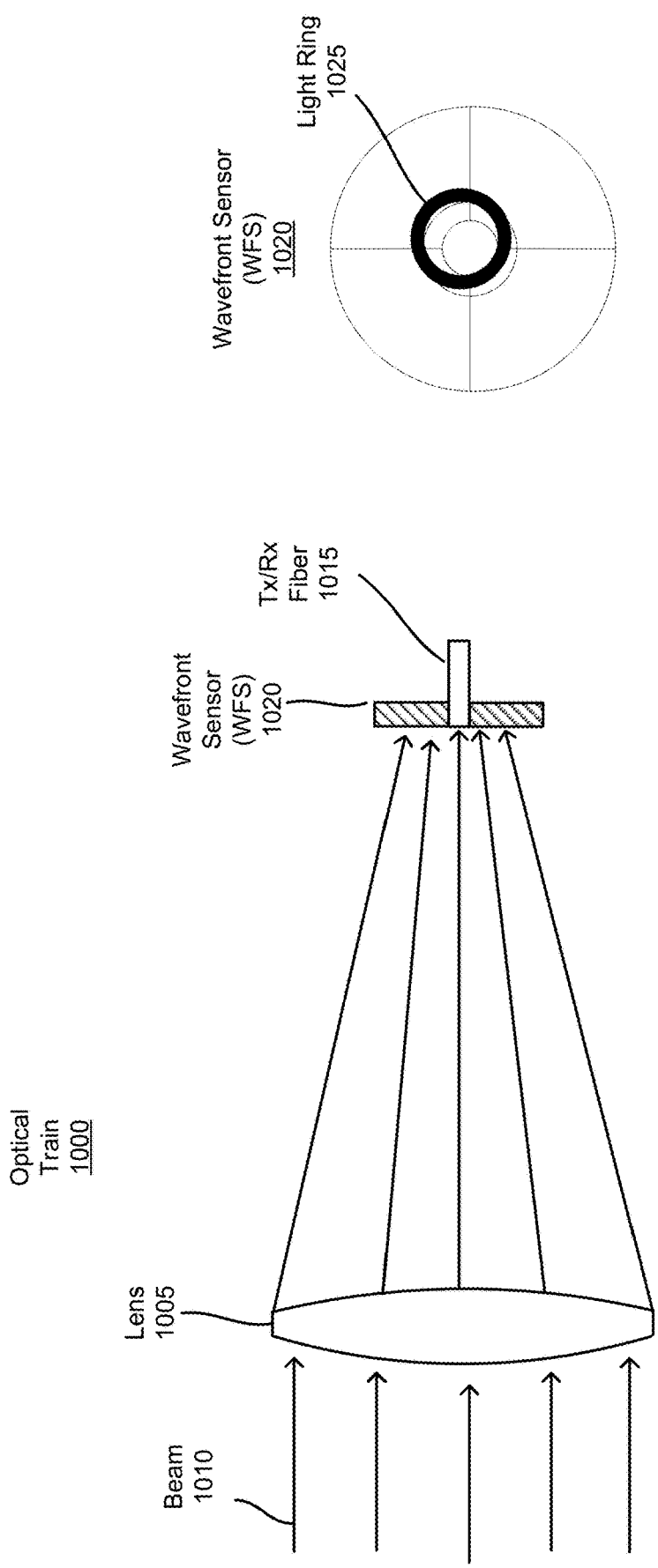
FIG. 10A is a diagram of a second example optical train for FSO beams received by an FSO terminal.
FIG. 10B is a front view of the WFS in FIG. 10A.

FIG. 10A is a diagram of a second example optical train 1000 for FSO beams received by a terminal (e.g., terminal 100 in FIG. 2). The optical train includes a lens 1005, a WFS 1020, and a Tx/Rx fiber 1015. WFS 1020 may be an embodiment of WFS 210 (e.g., WFS 300), and Tx/Rx fiber 1015 may be an embodiment of Tx/Rx fiber 215. The example of FIG. 10A does not illustrate Tx beams. The optical train 1000 may include in additional, fewer, or different components than those illustrated.

The lens 1005 receives light from beam 1010 (beam 1010 may be a beacon beam or a Rx beam). The lens 1005 is an optical component that directs (e.g., focuses) the beam 1010 toward the WFS 1020 and the Tx/Rx fiber 1015. The lens 1005 may be part of a beam steering unit (e.g., 205) or a telescope (e.g., 200) of the terminal.

In the example of FIG. 10A, lens 1005 is configured to direct light passing through a central region to the Tx/Rx fiber 1015. Additionally, lens 1005 is configured to direct light passing through the outer region to WFS 1020 (e.g., assuming the beam 1010 is aligned with the optical train 1000). For example, lens 1005 may be configured to direct light passing through the outer region to inner detectors of the WFS 1020.

Although lens 1005 is illustrated as a single component, lens 1005 may be one or more optical components. For example, the lens 1005 includes a central optical component (e.g., lens) that directs light towards the Tx/Rx fiber 1015 and a second optical component (e.g., lens) that surrounds the central optical component (e.g., a ring around the central component) and directs light toward the WFS 1020. In some embodiments, the second optical component is a bifocal lens that focuses light before and after the WFS 1020 (e.g., to reduce the effects of atmospheric scintillation).

FIG. 10B is a front view of the WFS 1020. In the example of FIG. 10B, only light that passed through the outer region of the lens 1005 is illustrated. Thus, the light forms a light ring 1025 on the WFS 1020. In the example of FIG. 10B, the light ring 1025 is misaligned with the WFS 1020 (the light ring 1025 is shifted to the right and up instead of being aligned with the inner detectors of WFS 1020).

Example Acquisition Processes

Figure 11:
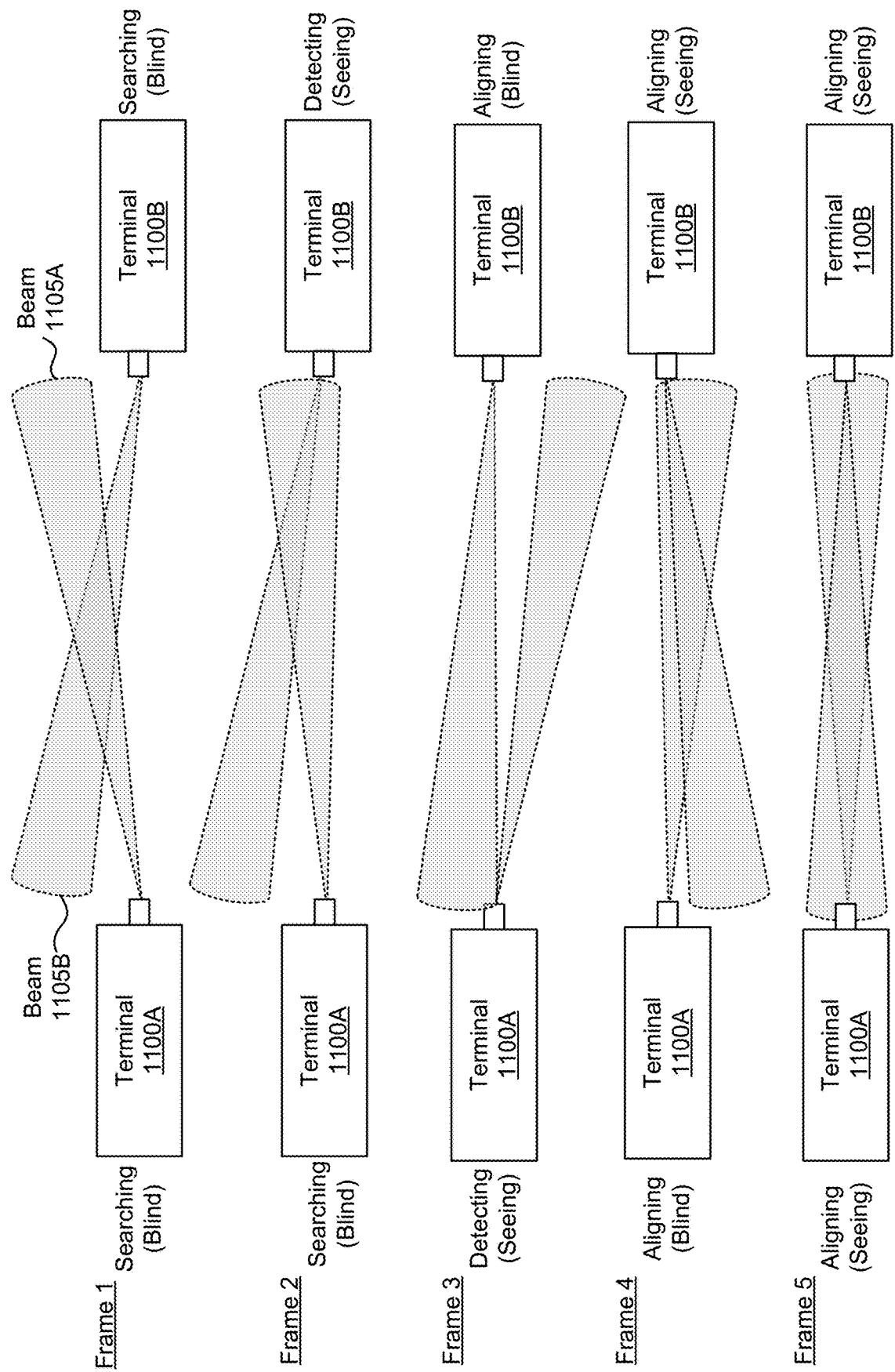
FIG. 11 is a diagram that illustrates an example beam acquisition process.

The below description with respect to FIGS. 11-13 describes example acquisition processes. FIG. 11 is a diagram that illustrates an example acquisition process, according to an embodiment. In the top frame, the Tx direction of each terminal 1100 is misaligned such that each beam is missing the other terminal and each terminal is therefore "blind" (no light seen). Both terminals scan their beams with the goal of causing the outgoing Tx beam to intersect the other terminal's Rx aperture. In the second frame, beam 1105A passes by terminal 1100B' s Rx aperture. Terminal 1100A is still blind, but terminal 1100B detects the incoming light allowing terminal 1100B to compute its alignment error. In the third frame, terminal 1100A has continued its scan past terminal 1100B, but terminal 1100B (now blind again) has adjusted its Tx direction based on the light detected during the second frame, and now terminal 1100A is seeing light from terminal 1100B such that terminal 1100A can compute its own alignment error. In the fourth frame, beam 1105B has wandered off terminal 1100A so terminal 110A is blind again, but terminal 1100A has adjusted its Tx direction based on the light detection from the third frame, and now terminal 1100B is again seeing light from terminal 1100A such that terminal 1100B can compute its alignment error once again. In the fifth frame, terminal 1100B has adjusted its Tx direction again such that its beam 1105B is seen by terminal 1100A. At this point, the terminals see light from each other and may transition to a tracking mode.

Figure 12A:
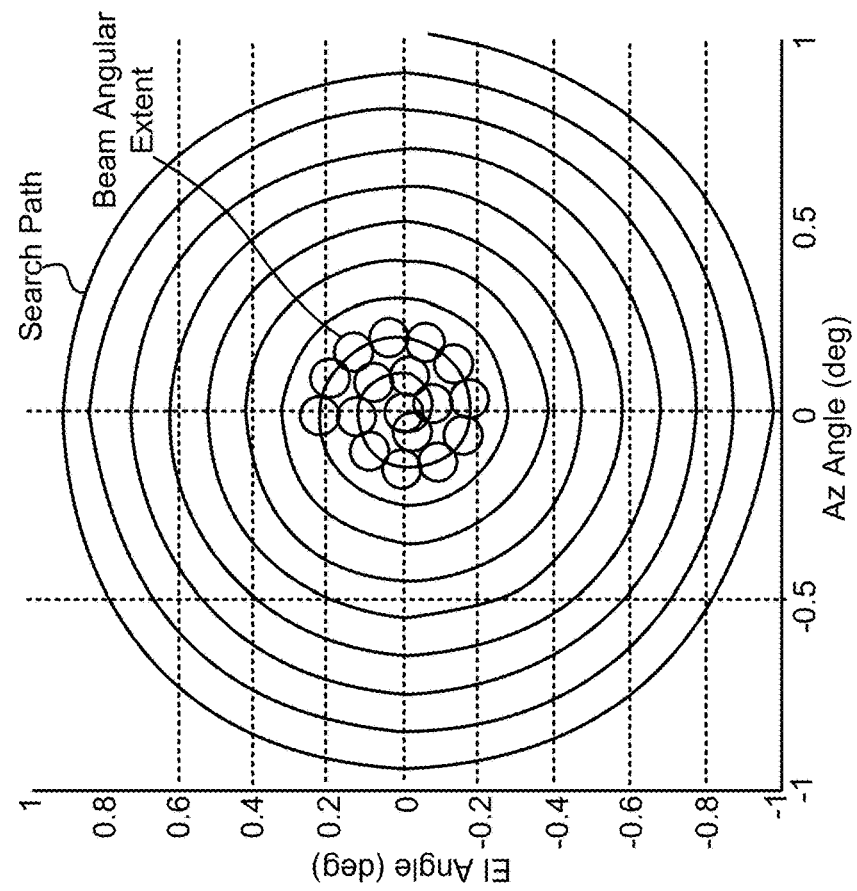
FIGS. 12A and 12B illustrate two example circular spiral search paths.
Figure 12B:
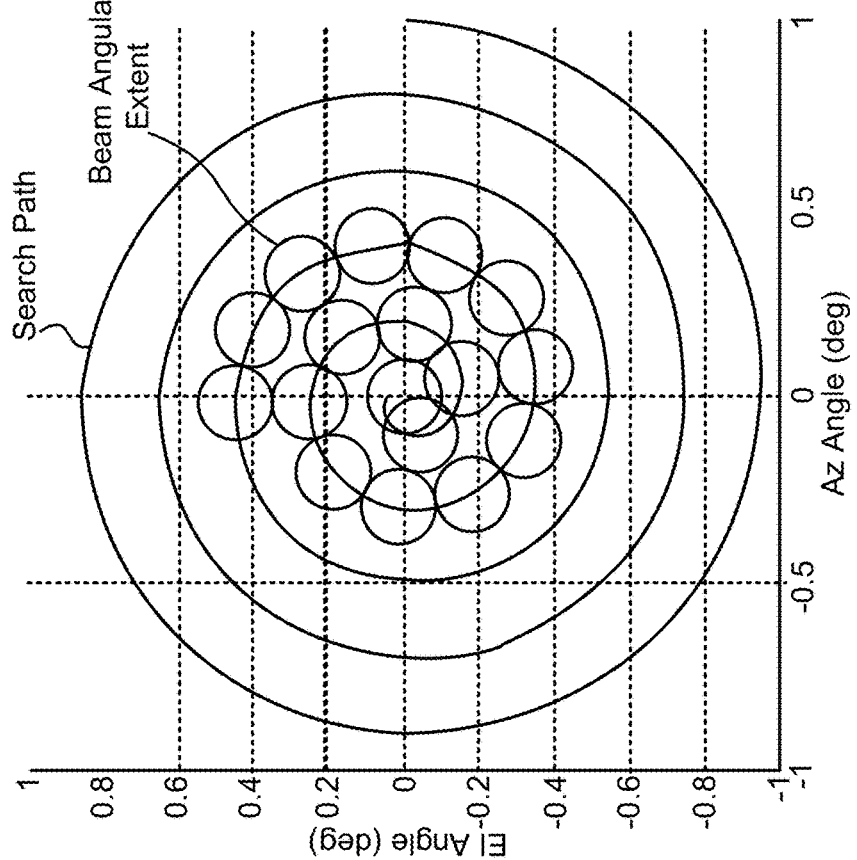

To scan a solid angle of space, a spiral path is a convenient approach for FSO acquisition. FIGS. 12A and 12B illustrate two example circular spiral search paths for the same search radius of 1 degree but using beam diameters 2× different than each other. A larger beam diameter allows a spiral pattern with more widely separated orbits, which reduces the search time by 4× compared to the 2× smaller beam. If the local terminal's spiral is too rapid, the turbulence pattern may be such that the turbulence induced intensity concentrations miss the far terminal's Rx aperture as the beam spirals by, in which case the local terminal would need to spend time repeating the search once the unsuccessful search has completed. If the local terminal's spiral is slower than is needed to guarantee that the remote terminal's Rx aperture successfully sees the local terminal's Tx light, then the search time will be larger than is necessary. Although a circular spiral pattern is illustrated in FIGS. 12A and 12B, other scanning patterns, such as elliptical, square, etc., may be used during the acquisition process.

Figure 13:
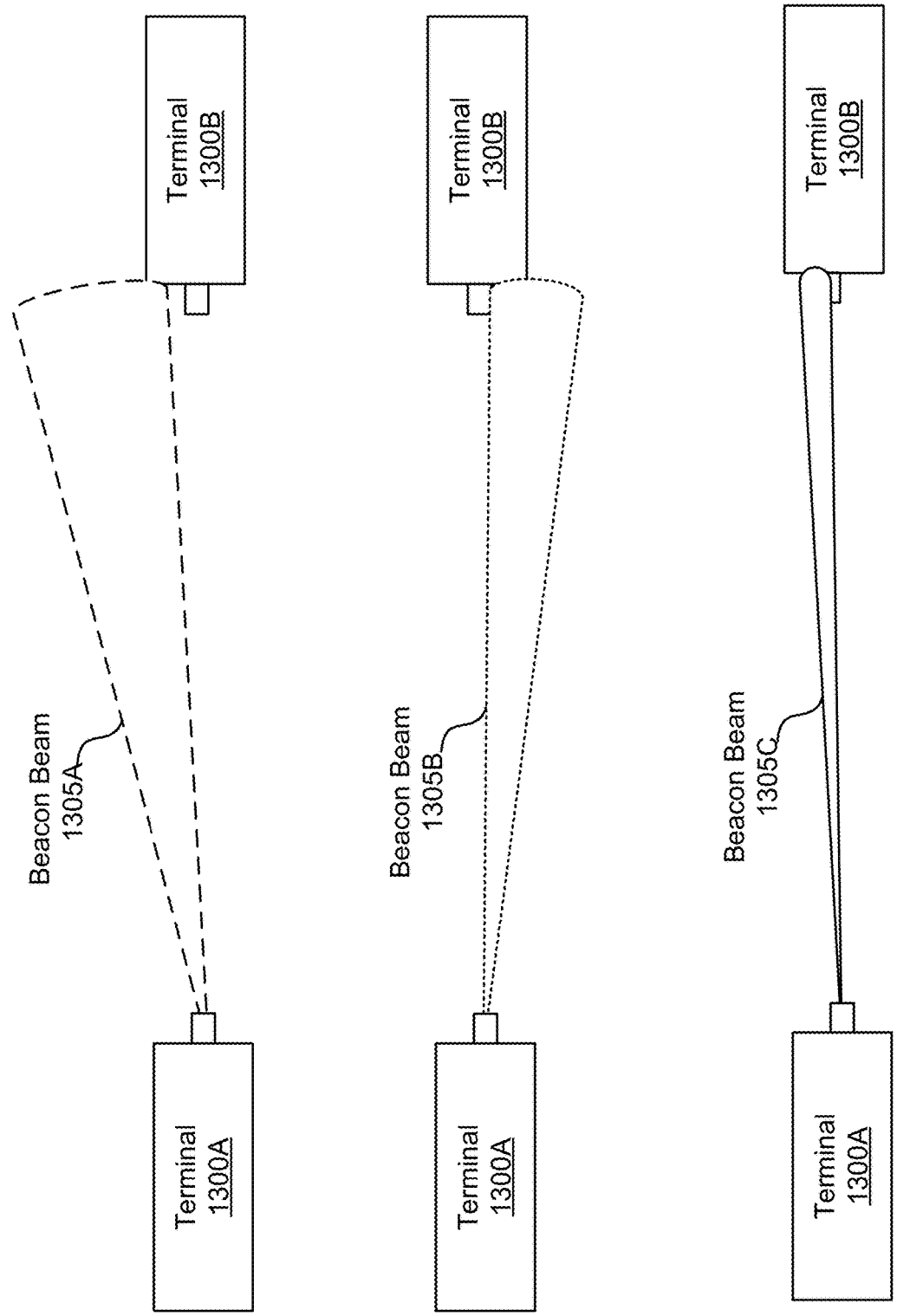
FIG. 13 is a diagram that illustrates another example acquisition process.

FIG. 13 is a diagram that illustrates an example acquisition process that includes dynamically adjusting beam divergence, according to an embodiment. Note that beams from terminal 1300B are omitted for simplicity. Early in the example acquisition process (e.g., when the location uncertainty of a remote terminal is high), it may be helpful to emit a beam with a large divergence (e.g., see beam 1305A). This may allow the remote terminal 1300B to quickly detect light from the local terminal 100A and gain an initial estimate of the terminal's location. After an initial estimate of a terminal's location is determined, the beam divergence may be reduced as the location estimate increases in accuracy (e.g., see beams 1305B and 1305C). It may be desirable to reduce a beam divergence because the receiving terminal collects a higher fraction of an already well-aligned beam's power when the beam has smaller divergence (e.g., as in beam 1305C). This in turn reduces time to further optimize alignment.

The relative benefit of higher or lower beam divergence may depend on the communication situation. In some embodiments and application scenarios, the controller (e.g., 250) may increase a beam divergence of a beacon beam to expand the range of angles over which another terminal can successfully acquire it. In other embodiments or application scenarios, the controller may decrease a beam divergence to increase the distance over which another terminal can successfully acquire it, at the expense of angular range over which the other terminal can acquire the beacon. Making beam divergence adjustable enables the controller to select either mode based on expectations for the angular and range position of the other terminal.

Additional Considerations

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

Depending on the form of the components, the "coupling" between components may take different forms. For example, dedicated circuitry can be coupled to each other by hardwiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values or quantities should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A free-space optical (FSO) terminal comprising:
   an alignment sensor comprising a set of detectors, each detector configured to generate a signal responsive to receiving electromagnetic radiation at a detection surface of the detector, the set of detectors comprising:
      an inner set of plural detectors with detection surfaces in a plane; and
      an outer set of plural detectors with detection surfaces in the plane, wherein the outer set of plural detectors surrounds the inner set of plural detectors in the planet, and wherein the outer set of plural detectors has a combined detection surface area greater than a combined detection surface area of the inner set of plural detectors; and
   a controller configured to:
      during a tracking process, adjust an orientation of the FSO terminal based on signals from the inner set of plural detectors; and
      during an acquisition process, adjust the orientation of the FSO terminal based on signals from the outer set of plural detectors.

2. The FSO terminal of claim 1, wherein, during the tracking process, the controller is configured to not use signals from the outer set of plural detectors.

3. The FSO terminal of claim 1, wherein, during the acquisition process, the controller is further configured to use signals from the inner set of plural detectors.

4. The FSO terminal of claim 1, wherein the controller is configured to perform the tracking process responsive to the FSO terminal establishing an FSO communication link with a remote FSO terminal.

5. The FSO terminal of claim 1, wherein the controller is configured to perform the acquisition process responsive to the FSO terminal not participating in an FSO communication link with a remote FSO terminal.

6. The FSO terminal of claim 1, wherein signals from the inner set of plural detectors have a greater signal-to-noise ratio (SNR) than signals from the outer set of plural detectors.

7. The FSO terminal of claim 1, wherein each detection surface of the inner set of plural detectors is smaller than each detection surface of the outer set of plural detectors.

8. The FSO terminal of claim 1, wherein the inner set of plural detectors forms a circle or a ring at the plane, and wherein the outer set of plural detectors forms a ring around the inner set of plural detectors at the plane.

9. The FSO terminal of claim 1, wherein the inner set of plural detectors forms a rectangle at the plane, and wherein the outer set of plural detectors forms a rectangle around the inner set of plural detectors at the plane.

10. The FSO terminal of claim 1, wherein the set of detectors further comprises a second outer set of plural detectors with detection surfaces in the plane, and wherein the second outer set of plural detectors surrounds the outer set of plural detectors in the plane.

11. The FSO terminal of claim 1, wherein the inner set of plural detectors includes at least three detectors, and wherein the outer set of plural detectors includes at least three detectors.

12. The FSO terminal of claim 1, wherein the inner set of plural detectors and the outer set of plural detectors include a same number of detectors.

13. The FSO terminal of claim 1, wherein the inner set of plural detectors and the outer set of plural detectors include a same type of detector.

14. The FSO terminal of claim 1, wherein the detection surfaces of the outer set of plural detectors is larger than the detection surfaces of the inner set of plural detectors.

15. The FSO terminal of claim 1, further comprising a masking layer covering a portion of the alignment sensor.

16. The FSO terminal of claim 1, wherein each detector surface of the inner set of plural detectors or the outer set of plural detectors is substantially the same size.

17. The FSO terminal of claim 1, wherein the inner set of detectors surrounds a cavity in the alignment sensor in the plane.

18. The FSO terminal of claim 1, wherein the inner set of plural detectors surrounds a detector that is not part of the inner set of plural detectors or the outer set of plural detectors.

19. The FSO terminal of claim 1, wherein the controller is further configured to adjust an orientation of a beam steering unit in order to adjust the orientation of the FSO terminal.

20. A method comprising:

receiving electromagnetic radiation via detection surfaces of plural detectors of an FSO terminal;

generating a signal in response to the electromagnetic radiation received at the detection surfaces;

causing an adjustment of an orientation of the FSO terminal during a tracking process based on the generated signal derived from an inner set of plural detectors of the plural detectors; and causing an adjustment of the orientation of the FSO terminal based on an acquisition process based on the generated signal derived from an outer set of plural detectors of the plural detectors;

wherein the outer set of plural detectors surrounds the inner set of plural detectors, and wherein the detection surfaces of the outer set of plural detectors and the inner set of plural detectors are located in a plane.

* * * * *